(12) United States Patent
Balabin et al.

(10) Patent No.: US 12,307,371 B2
(45) Date of Patent: May 20, 2025

(54) DISCOVERING NOVEL ARTIFICIAL NEURAL NETWORK ARCHITECTURES

(71) Applicant: Blaize, Inc., El Dorado Hills, CA (US)

(72) Inventors: Ilya A. Balabin, Morrisville, NC (US); Adam P. Geringer, Raleigh, NC (US)

(73) Assignee: Blaize, Inc., El Dorado Hills, CA (US)

( * ) Notice: Subject to any disclaimer, the term of this patent is extended or adjusted under 35 U.S.C. 154(b) by 1005 days.

(21) Appl. No.: 17/182,334

(22) Filed: Feb. 23, 2021

(65) Prior Publication Data

US 2021/0365794 A1 Nov. 25, 2021

Related U.S. Application Data

(60) Provisional application No. 63/029,509, filed on May 24, 2020.

(51) Int. Cl.
*G06N 3/045* (2023.01)
*G06F 18/214* (2023.01)
*G06N 3/082* (2023.01)
*G06N 3/084* (2023.01)
(Continued)

(52) U.S. Cl.
CPC .......... *G06N 3/082* (2013.01); *G06F 18/2148* (2023.01); *G06N 3/086* (2013.01)

(58) Field of Classification Search
CPC ..... G06N 3/082; G06N 3/086; G06F 18/2148
See application file for complete search history.

(56) References Cited

U.S. PATENT DOCUMENTS 9,015,093 B1 4/2015 Commons

OTHER PUBLICATIONS

Bhuiyan, Zakirul Alam, "An Algorithm for Determining Neural Network Architecture Using Differential Evolution", 2009, International Conference on Business Intelligence and Financial Engineering, pp. 5-6. (Year: 2009).*

(Continued)

*Primary Examiner* — Andrew J Jung
*Assistant Examiner* — Skylar K Vanwormer
(74) *Attorney, Agent, or Firm* — Brian R. Short

(57) ABSTRACT

Methods, systems and apparatuses for discovering novel artificial neural network architectures (ANN) architecture are disclosed. One method includes calculating ANN architecture fingerprints including an ANN architecture fingerprint of each of a plurality of existing ANN architectures, creating a plurality of next-generation candidate ANN architectures, calculating a plurality of next-generation candidate ANN architecture fingerprints including an ANN architecture fingerprint of each of the plurality of next-generation candidate ANN architectures, calculating ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints, retraining each of the plurality of next-generation candidate ANN architectures on the training dataset, obtaining a performance score of each of the next-generation candidate ANN architectures, and calculating a fitness score for each of the next-generation candidate ANN architectures.

20 Claims, 7 Drawing Sheets

(51) Int. Cl.
  *G06N 3/086* (2023.01)
  *G06N 20/00* (2019.01)

(56) References Cited

OTHER PUBLICATIONS

Abraham, Ajith and Baikunth Nath, "Hybrid Heuristics for Optimal Design of Artificial Neural Networks", 2001, Springer-Verlag Berlin Heidelberg, pp. 16-20 (Year: 2001).*

Hu, Hengyuan, Rui Peng, Yu-Wing Tai and Chi-Keung Tang, "Network Trimming: A Data-Driven Neuron Pruning Approach towards Efficient Deep Architectures", 2016, arXiv, pp. 3-4 (Year: 2016).*

Yao, Xin and Yong Liu, "A New Evolutionary System for Evolving Artificial Neural Networks", 1997, IEEE, pp. 696-697. (Year: 1997).*

Rocco, Ignacio, Relja Arandjelovic and Josef Sivic, "Convolutional neural network architecture for geometric matching", 2017, IEEE, pp. 6149-6152. (Year: 2017).*

Perera, D.C., Mathotaarachchi, L. Udawatta and A.S. Perera, "ANNEbot: An Evolutionary Artificial Neural Network Framework", 2012, International Conference on Intelligent and Advanced Systems, pp. 41-42 (Year: 2012).*

Praveen N., "Development of a Biometric Personal Authentication System Based on Fingerprint and Speech", 2013, Cochin University, pp. 56 and 78 (Year: 2013).*

Neural Architecture Search: A Survey, Thomas Elsken, Jan Hendrik Metzen, Frank Hutter, Journal of Machine Learning Research 20 (2019) 1-21, Submitted Sep. 2018; Revised Mar. 2019; Published Mar. 2019.

Regularized Evolution for Image Classifier Architecture Search, Esteban Real, Alok Aggarwaly, Yanping Huangy, Quoo V. Le, Google Brain, Mountain View, California, USA, Feb. 16, 2019.

A Survey on Neural Architecture Search, Martin Wistuba, Ambrish Rawat, Tejaswini Pedapati, IBM Research AI, Jun. 18, 2019.

* cited by examiner

One or more Computing Devices 320

*select a plurality of existing ANN architectures of a same architecture type as any ANN architectures that have been used for performing the specified inference task, and selecting a plurality of existing datasets that have been used to train the plurality of the existing ANN architectures;
 *calculate a plurality of existing dataset fingerprints for each of the plurality of existing datasets and a target dataset fingerprint for the target dataset;
 *calculate dataset pairwise similarities between each of the plurality of existing datasets and the target dataset using the plurality of the existing dataset fingerprints and the target dataset fingerprint;
 *identify an existing dataset of the plurality of datasets that is closest to the target dataset using the pairwise similarities between each of the plurality of the existing datasets and the target dataset;
 *split the existing dataset that is closest to the target dataset into a training dataset and an evaluation dataset;
 *calculate a plurality of existing ANN architecture fingerprints, including an ANN architecture fingerprint of each of the plurality of existing ANN architectures;
 *calculate existing ANN architecture pairwise similarities between each two of the plurality of the existing ANN architectures;
 *create a minimum possible configuration ANN architecture as a starting point of the guided evolutionary growth process;
 *create a plurality of next-generation candidate ANN architectures based on the minimum possible configuration ANN architecture or, if available, current-generation candidate ANN architectures;
 *calculate a plurality of next-generation candidate ANN architecture fingerprints including an ANN architecture fingerprint of each of the plurality of next-generation candidate ANN architectures;
 *calculate evolving ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints;
 *calculate cumulative similarities between each of the next-generation candidate ANN architecture and the plurality of the existing ANN architectures using the existing ANN architecture pairwise similarities and the evolving ANN architecture pairwise similarities;
 *retrain each of the plurality of next-generation candidate ANN architectures with the training dataset;
 *obtain a performance score of each of the plurality of retrained next-generation candidate ANN architectures using the evaluation dataset and the specified performance criteria; and
 *calculate a fitness score for each of the plurality of next-generation candidate ANN architectures using the performance scores and the cumulative similarities.

Memory with stored instructions 325

Computer Network 330

Applications 340

Database 310

FIGURE 3

Selecting a plurality of existing ANN architectures of a same architecture type as ANN architectures that have been used for performing the specified inference task, and selecting a plurality of existing datasets that have been used to train the plurality of the existing ANN architectures
410

Calculating a plurality of existing dataset fingerprints for each of the plurality of existing datasets and a target dataset fingerprint for the target dataset
420

Calculating dataset pairwise similarities between each of the plurality of existing datasets and the target dataset using the plurality of the existing dataset fingerprints and the target dataset fingerprint
430

Identifying an existing dataset of the plurality of existing datasets that is closest to the target dataset using the dataset pairwise similarities between each of the plurality of the existing datasets and the target dataset
440

Splitting the existing dataset that is closest to the target dataset into a training dataset and an evaluation dataset
450

Calculating a plurality of existing ANN architecture fingerprints, including an ANN architecture fingerprint of each of the plurality of existing ANN architectures
460

Calculating the existing ANN architecture pairwise similarities between every two of the plurality of the existing ANN architectures using the existing ANN architecture fingerprints
470

Creating a minimum possible configuration ANN architecture as a starting point of the guided evolutionary growth process
480

FIGURE 4

Creating a plurality of next-generation candidate ANN architectures based on the minimum possible configuration ANN architecture or, if available, current-generation candidate ANN architectures
590

Calculating a plurality of next-generation candidate ANN architecture fingerprints including an ANN architecture fingerprint of each of the plurality of next-generation candidate ANN architectures
5010

Calculating evolving ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints
5011

Calculating cumulative similarities between each of the next-generation candidate ANN architecture and the plurality of the existing ANN architectures using the existing ANN architecture pairwise similarities and the evolving ANN architecture pairwise similarities
5012

Retraining each of the plurality of next-generation candidate ANN architectures with the training dataset
5013

Obtaining a performance score of each of the plurality of retrained next-generation candidate ANN architectures using the evaluation dataset and the specified performance criteria
5014

Calculating a fitness score for each of the plurality of next-generation candidate ANN architectures using the performance scores and the cumulative similarities.
5015

FIGURE 5

One or more Computing Devices 320

*select a plurality of existing ANN architectures of a same architecture type as any ANN architectures that have been used for performing the specified inference task, and selecting a plurality of existing datasets that have been used to train the plurality of the existing ANN architectures;

*calculate a plurality of existing dataset fingerprints for each of the plurality of existing datasets and a target dataset fingerprint for the target dataset;

*calculate dataset pairwise similarities between each of the plurality of existing datasets and the target dataset using the plurality of the existing dataset fingerprints and the target dataset fingerprint;

*identify an existing dataset of the plurality of datasets that is closest to the target dataset using the pairwise similarities between each of the plurality of the existing datasets and the target dataset;

*split the existing dataset that is closest to the target dataset into a training dataset and an evaluation dataset;

*calculate a plurality of existing ANN architecture fingerprints, including an ANN architecture fingerprint of each of the plurality of existing ANN architectures;

*calculate existing ANN architecture pairwise similarities between each two of the plurality of the existing ANN architectures;

*create a minimum possible configuration ANN architecture as a starting point of the guided evolutionary growth process;

*create a plurality of next-generation candidate ANN architectures based on the minimum possible configuration ANN architecture or, if available, current-generation candidate ANN architectures;

*calculate a plurality of next-generation candidate ANN architecture fingerprints including an ANN architecture fingerprint of each of the plurality of next-generation candidate ANN architectures;

*calculate evolving ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints;

*calculate cumulative similarities between each of the next-generation candidate ANN architecture and the plurality of the existing ANN architectures using the existing ANN architecture pairwise similarities and the evolving ANN architecture pairwise similarities;

*retrain each of the plurality of next-generation candidate ANN architectures with the training dataset;

*obtain a performance score of each of the plurality of retrained next-generation candidate ANN architectures using the evaluation dataset and the specified performance criteria; and

*calculate a fitness score for each of the plurality of next-generation candidate ANN architectures using the performance scores and the cumulative similarities.

Memory with stored instructions 325

One or more Sensors 680

Computer Network 330

Applications 340

Database 310

FIGURE 6

DISCOVERING NOVEL ARTIFICIAL NEURAL NETWORK ARCHITECTURES

RELATED APPLICATIONS

This patent application claims priority to U.S. Patent Provisional Application Ser. No. 63/029,509, filed May 24, 2020, which is herein incorporated by reference.

FIELD OF THE EMBODIMENTS

The described embodiments relate generally to computer processing. More particularly, the described embodiments relate to methods, apparatuses and systems for discovering novel artificial neural network architectures.

BACKGROUND

Artificial neural networks (ANN) are computing systems inspired by biological neural networks in human brain. ANN consist of nodes ("neurons") that are pairwise connected by vertices ("synapses"). Each node has a state characterized by a real number, usually in the range from 0.0 to 1.0, and each connection has a strength characterized by a real number. Usually, the nodes are organized in layers in such a way that no two nodes within same layer are connected, and connections only exist between nodes from different layers. The first layer is called the input layer, and the states of its nodes are set by the ANN input. The next layers are called hidden layers except the last layer that is called the output layer. The states of the nodes in these layers are calculated recursively, one layer at a time: the state of each node is obtained by first calculating a sum of the states of connected nodes from the previous layers weighted by the respective connection strengths ("weights"), then possibly adding a real number ("bias") to the sum, and finally passing the calculated number through the activation function of the node itself. The states of the nodes in the output layer represent the result of the calculations. Hereafter, all ANN parameters other than the states of the nodes, the strengths of pairwise connections among those nodes, and the node biases are referred to as hyperparameters, the map of the ANN layer structure and pairwise connections among its nodes is referred to as the ANN topology, and the combination of the ANN topology and hyperparameters is referred to as the ANN architecture.

In order to function, the ANN need to be first trained by presenting a training dataset. Here, a dataset is defined as a collection of data points, where each data point characterizes an object using a mathematical description of the object structure and optionally a set of true alphanumeric, categorical, numeric, or other labels that characterize the object properties. Also, it is required that all objects described by the data points in a dataset are of a same type (e.g., audio recordings), the mathematical descriptions in all data points have same format (for example, one-dimensional time series of real numbers), and the sets of labels in all data points, if present, have same format (for example, a categorical label that defines a music genre). For example, an image dataset is a collection of data points, where each data point describes an image as an array of pixels and optionally a set of one or more labels, and each pixel is described by two coordinates that define its position within the image (usually but not necessarily the X and Y coordinates) and a set of base color intensities (usually but not necessarily RGB for red, green, and blue). Hereafter, different datasets are considered to be of same type if all these datasets describe objects of a same type and all data points therein include a same format of mathematical description of the objects and a same format of object labels, if the latter are present.

ANN can be used for several types of learning, with the most common ones being supervised learning (predictions of object label values from the mathematical description of the object structure), unsupervised learning (classification or regression of objects when no labels are present), and reinforcement learning (identifying the optimal policy that maximizes rewards according to specified criteria).

It is desirable to have a method, apparatus and system for discovering novel ANN architectures.

SUMMARY

One embodiment includes a method for discovering novel ANN architectures through guided evolutionary growth. The method includes selecting a plurality of existing ANN architectures of a same architecture type as ANN architectures that have been used for performing the specified inference task, and selecting a plurality of existing datasets that have been used to train the plurality of the existing ANN architectures, calculating a plurality of existing dataset fingerprints for each of the plurality of existing datasets and a target dataset fingerprint for the target dataset, calculating dataset pairwise similarities between each of the plurality of existing datasets and the target dataset using the plurality of the existing dataset fingerprints and the target dataset fingerprint, identifying an existing dataset of the plurality of existing datasets that is closest to the target dataset using the dataset pairwise similarities between each of the plurality of the existing datasets and the target dataset, splitting the existing dataset that is closest to the target dataset into a training dataset and an evaluation dataset, calculating existing ANN architecture pairwise similarities between each two of the plurality of the existing ANN architectures, creating a minimum possible configuration ANN architecture as a starting point of the guided evolutionary growth process, creating a plurality of next-generation candidate ANN architectures based on the minimum possible configuration ANN architecture or, if available, current-generation candidate ANN architectures, calculating a plurality of next-generation candidate ANN architecture fingerprints including an ANN architecture fingerprint of each of the plurality of next-generation candidate ANN architectures, calculating evolving ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints, calculating cumulative similarities between each of the next-generation candidate ANN architecture and the plurality of the existing ANN architectures using the existing ANN architecture pairwise similarities and the evolving ANN architecture pairwise similarities, retraining each of the plurality of next-generation candidate ANN architectures with the training dataset, obtaining performance scores, including a performance score of each of the plurality of retrained next-generation candidate ANN architectures using the evaluation dataset and the specified performance criteria, and calculating a fitness score for each of the plurality of next-generation candidate ANN architectures using the performance scores and the cumulative similarities.

Another embodiment includes a system for discovering novel ANN architectures through guided evolutionary growth. The system includes a database, one or more computing devices connected through a network to the database, and memory. The memory includes instructions that, when executed by the one or more computing devices, enables the system to select a plurality of existing ANN architectures of a same architecture type as any ANN architectures that have been used for performing the specified inference task and select a plurality of existing datasets that have been used to train the plurality of the existing ANN architectures, calculate a plurality of existing dataset fingerprints for each of the plurality of existing datasets and a target dataset fingerprint for the target dataset, calculate dataset pairwise similarities between each of the plurality of existing datasets and the target dataset using the plurality of the existing dataset fingerprints and the target dataset fingerprint, identify an existing dataset of the plurality of datasets that is closest to the target dataset using the pairwise similarities between each of the plurality of the existing datasets and the target dataset, split the existing dataset that is closest to the target dataset into a training dataset and an evaluation dataset, calculate a plurality of existing ANN architecture fingerprints including an ANN architecture fingerprint of each of the plurality of existing ANN architectures, calculate existing ANN architecture pairwise similarities between each two of the plurality of the existing ANN architectures, create a minimum possible configuration ANN architecture as a starting point of the guided evolutionary growth process, create a plurality of next-generation candidate ANN architectures based on the minimum possible configuration ANN architecture or, if available, current-generation candidate ANN architectures, calculate a plurality of next-generation candidate ANN architecture fingerprints including an ANN architecture fingerprint of each of the plurality of next-generation candidate ANN architectures, calculate evolving ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints, calculate cumulative similarities between each of the next-generation candidate ANN architecture and the plurality of the existing ANN architectures using the existing ANN architecture pairwise similarities and the evolving ANN architecture pairwise similarities, retrain each of the plurality of next-generation candidate ANN architectures with the training dataset, obtain performance scores including a performance score of each of the plurality of retrained next-generation candidate ANN architectures using the evaluation dataset and the specified performance criteria, and calculate a fitness score for each of the plurality of next-generation candidate ANN architectures using the performance scores and the cumulative similarities.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 shows a system for discovering novel ANN architectures for performing a specified inference task on a target dataset with specified performance criteria by means of a guided evolutionary growth process, according to an embodiment.

FIG. 4 is a flow chart that includes a first set of steps of a method for discovering novel ANN architectures for performing a specified inference task on a target dataset with specified performance criteria by means of a guided evolutionary growth process, according to an embodiment.

FIG. 5 is a flow chart that includes a second set of steps of the method for discovering novel ANN architectures for performing a specified inference task on a target dataset with specified performance criteria by means of a guided evolutionary growth process, according to an embodiment.

FIG. 6 and FIG. 7 shows systems for discovering novel ANN architectures for performing a specified inference task on a target dataset with specified performance criteria by means of a guided evolutionary growth process, wherein one or more sensors operate to generate sensed data that a novel ANN architecture processes, according to an embodiment.

DETAILED DESCRIPTION

Figure 1:
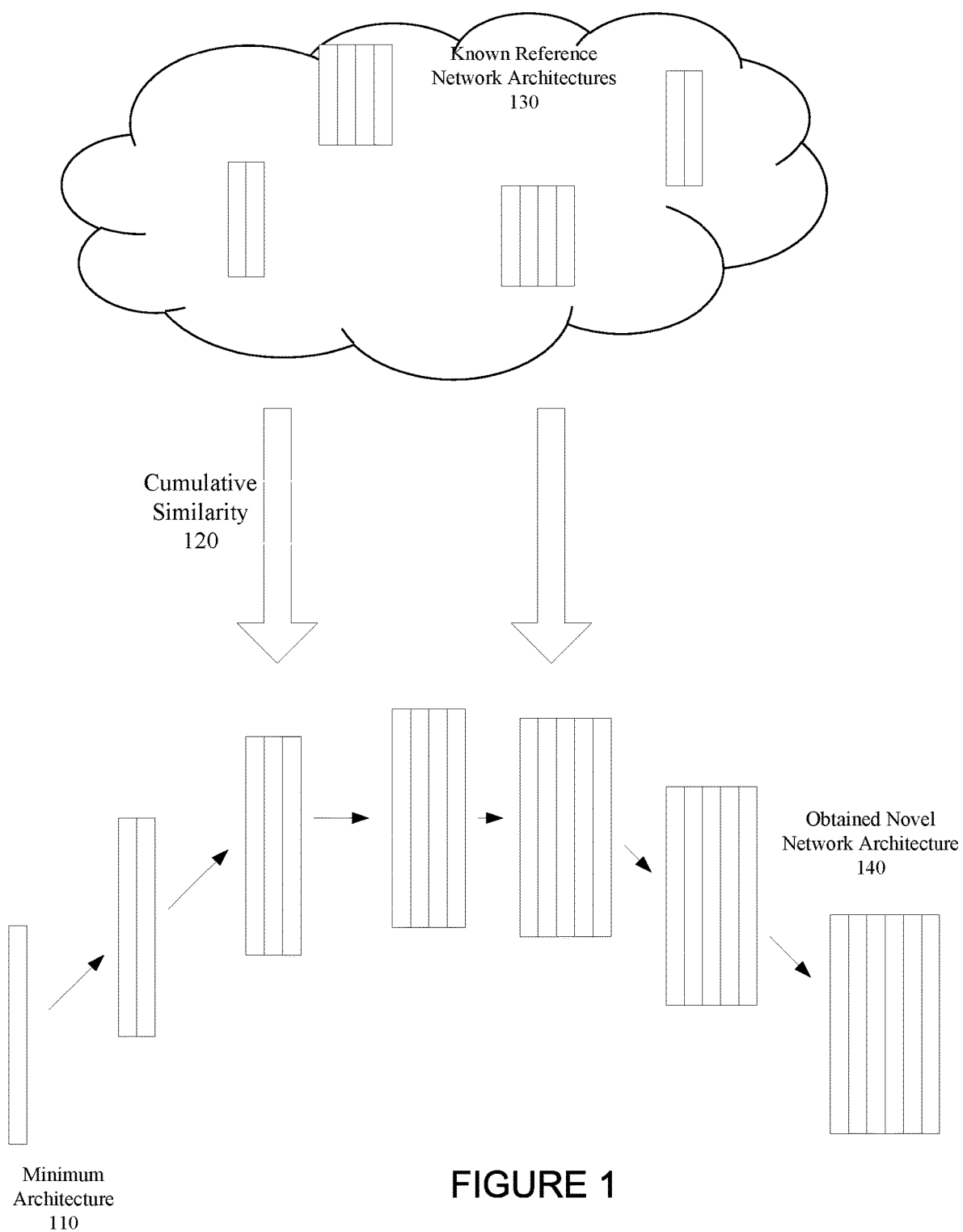
FIG. 1 shows a process of obtaining novel ANN architectures by means of incremental evolutionary growth starting from a minimum possible configuration ANN architecture, according to an embodiment.

The described embodiments are embodied in methods, apparatuses and systems for discovering novel ANN architectures. For clarity, the description of training, evaluation, and inference presented hereafter applies to supervised learning (that is, predicting object label values from object mathematical descriptions). However, the described embodiments are not limited to supervised learning. That is, the described embodiments also apply to other types of learning, given appropriate performance criteria that do not necessarily depend on the presence of object labels.

In supervised learning, training an ANN consists of repeated cycles ("epochs") of forward propagation followed by backpropagation. During forward propagation, the mathematical descriptions of the objects from a training dataset, one by one, are used to set the states of the nodes in the input ANN layer. After setting the states of the input layer nodes, the states of the nodes in each subsequent layer are calculated in steps, one layer after another, as described above. The states of the nodes in the output layer represent the ANN output, for example, the label values evaluated by the ANN. During backpropagation, these values are compared with the true label values from the training dataset, and corrections to the pairwise connections among the ANN nodes (weights) and node offsets (biases) are calculated in order to optimize specified performance criteria. The performance criteria usually include one of commonly used accuracy metrics (for example, precision, balanced accuracy, or other accuracy metrics for classification tasks or mean square deviation for regression tasks), possibly but not necessarily combined with one or more characteristics of computational efficiency (for example, calculation time, size in memory, or similar). Usually, the forward propagation-backpropagation cycles are repeated a specified number of times ("epochs"), or until the performance score reaches a specified value, or until the performance score no longer improves with each epoch. After that, all connection strengths among the nodes and all node biases are fixed and can no longer change, and the ANN can be used for evaluation and then inference.

The evaluation of an ANN is performed in order to characterize the ANN ability to predict label values for objects that the ANN has not learned during training. The evaluation involves a single forward propagation run with an evaluation dataset, which is of the same type as the training dataset but includes no data points present in the training dataset. For an embodiment, the training dataset and the evaluation dataset are obtained by randomizing (shuffling) and splitting an available dataset so that the training dataset includes 70-90% or more data points and the evaluation dataset includes 10-30% or fewer data points, depending on the available dataset size. During the evaluation, various ANN accuracy metrics are obtained by means of comparing the label values calculated during the forward propagation run with the true label values. The obtained accuracy metrics characterize the expected ANN accuracy when predicting label values for objects not learned during training. Inference, i.e., the process of predicting label values, involves a single forward propagation run with an inference dataset, which is of the same type as the training dataset and the evaluation dataset, but misses the true labels. For example, if an ANN was trained on a training dataset that consists of labeled images of cats and dogs, it can be evaluated using an evaluation dataset that consists of labeled images of cats and dogs (such that no image from the training dataset is present in the evaluation dataset) and then used for inference with an inference dataset that consists of unlabeled cat and dog images in order to estimate which kind of animal is in each image. Hereafter, different inference tasks are considered to be of same type if they are performed on datasets of a same type and produce object labels of a same type. Also, different ANN architectures are considered to be of same type if they use as an input datasets of same type and perform inference tasks of a same type.

Currently, human-designed ANN architectures populate a tiny fraction of the entire space of the possible ANN architectures. The vast majority of that space is still uncharted, and exploring it may reveal novel ANN architectures that significantly outperform currently existing ones. Whereas network architecture search (NAS) methods attempt to identify such networks by searching the ANN architecture space, those searches usually require extremely large amounts of computing resources and are therefore limited to select subspaces of the entire ANN architecture space. As such, the development of efficient methods for discovering novel advanced ANN architectures remains a challenge.

As previously stated, the development of efficient methods for discovering novel advanced ANN architectures remains a challenge. At least some of the described embodiments address this challenge by providing a process for evolutionary growing novel ANN architectures from a minimum possible configuration. The novelty of the obtained ANN architectures is achieved by means of guiding the evolutionary growth away from existing ANN architectures (hereafter called reference ANN architectures). Since the process involves little ANN training (last layers only, followed by a few epochs of training the entire network to improve consistency), the process can operate significantly faster and require significantly less computational resources than the conventional NAS methods, providing therefore a significant improvement over the latter.

The described embodiments provide processes for discovering novel ANN architectures that populate previously unexplored domains of the ANN architecture space. The process involves incremental evolutionary growth of ANN architectures starting from a minimum possible configuration. Hereafter, the minimum possible configuration of an ANN of some type is the ANN configuration of that type that includes the smallest possible number of layers and is capable of performing same types of inference tasks as ANNs of that type perform. For example, the minimum possible configuration of a fully connected ANN is the configuration with a single hidden layer (a.k.a. single layer perceptron). Likewise, the minimum possible configuration of a convolutional ANN is a convolutional layer followed up by a maxpool layer. The growth is guided by means of adding to the fitness score of evolving ANN architectures terms that depend on pairwise similarities among the evolving ANN architectures and the reference ANN architectures. Including these terms in the fitness score results in guiding the evolutionary growth away from the reference ANN architectures and to previously untapped domains of the ANN architecture space, potentially leading to discoveries of novel ANN architectures that could outperform the current state-of-the-art ANN architectures. In addition, the pairwise ANN architecture similarities can be used to map the entire ANN architecture space to a low-dimensional human-readable representation, thereby providing, for the first time, means for navigating the ANN architecture space.

FIG. 1 shows ANN architectures that are obtained by means of incremental evolutionary growth starting from a minimum possible configuration ANN architecture 110, according to an embodiment. Each evolutionary step starts with creating next-generation candidate ANN architectures from a current-generation of ANN architectures (which is the minimum possible ANN architecture at the first step and the outcome of previously completed evolutionary steps thereafter) by means of randomly adding, altering, and/or deleting a layer or a few layers and permutating the type, connectivity, and hyperparameters of the added or changed layer(s). Each of the obtained next-generation candidate ANN architectures is retrained with a training set. A process of retraining includes training the added layers only (by freezing the connection strengths (weights) and node offsets (biases) in all but the added layers) with the training set, followed by a few iterations (epochs) of training the entire ANN with the training set to achieve better consistency. For each next-generation candidate ANN architecture, a fitness score is calculated as a weighted combination of an ANN architecture performance score (with a specified dataset and performance criteria) with a positive weight and a cumulative similarity between the next generation ANN architecture and the reference ANN architectures with a negative weight. The cumulative similarity between a next generation ANN architecture candidate and the reference ANN architectures can be obtained, for example, as follows:

a) calculating ANN architecture fingerprints for the ANN architecture candidates and the reference ANN architectures (the latter are calculated at the first step only and are then reused at all subsequent steps);

b) calculating all pairwise ANN architecture similarities among the ANN architecture candidate and the plurality of the reference ANN architectures;

c) converting each calculated pairwise ANN architecture similarity into a pairwise distance between the corresponding ANN architectures in the ANN architecture space, for example, as $d_{ij}=1/(1-S_{ij})$, where $S_{ij}$ is a pairwise similarity between ANN architectures i and j and $d_{ij}$ is the distance between ANN architectures i and j in the ANN architecture space;

d) calculating a Machalanobis or similar distance between the ANN architecture candidate and the plurality of the reference ANN architectures using the pairwise distances calculated in c);

e) finally, converting the calculated Machalanobis or similar distances back into the cumulative measures of similarity, for example, as $S_k=1-1/d_k^M$, where $d_k^M$ is the Machalanobis or similar distance between ANN architecture candidate k and the plurality of the reference ANN architectures, and $S_k$ is the cumulative similarity between ANN architecture candidate k and the plurality of the reference ANN architectures. The obtained fitness scores are used for selecting the next generation ANN architecture candidates that survive the ongoing evolutionary step and will be passed to the next evolutionary step as then current ANN architectures. Including the cumulative measures of similarity 120 into the fitness scores guides the evolution away from the explored domains that contain the reference ANN architectures 130 and towards the uncharted domains of the ANN architecture space, potentially leading to discovering novel ANN architectures 140 with superior performance. Also, the obtained distances in the ANN architecture space can then be used to map that space to a low-dimensional human-readable representation using, for example, t-SNE or other dimension reduction techniques, thereby providing means for navigating the ANN architecture space.

Figure 2:
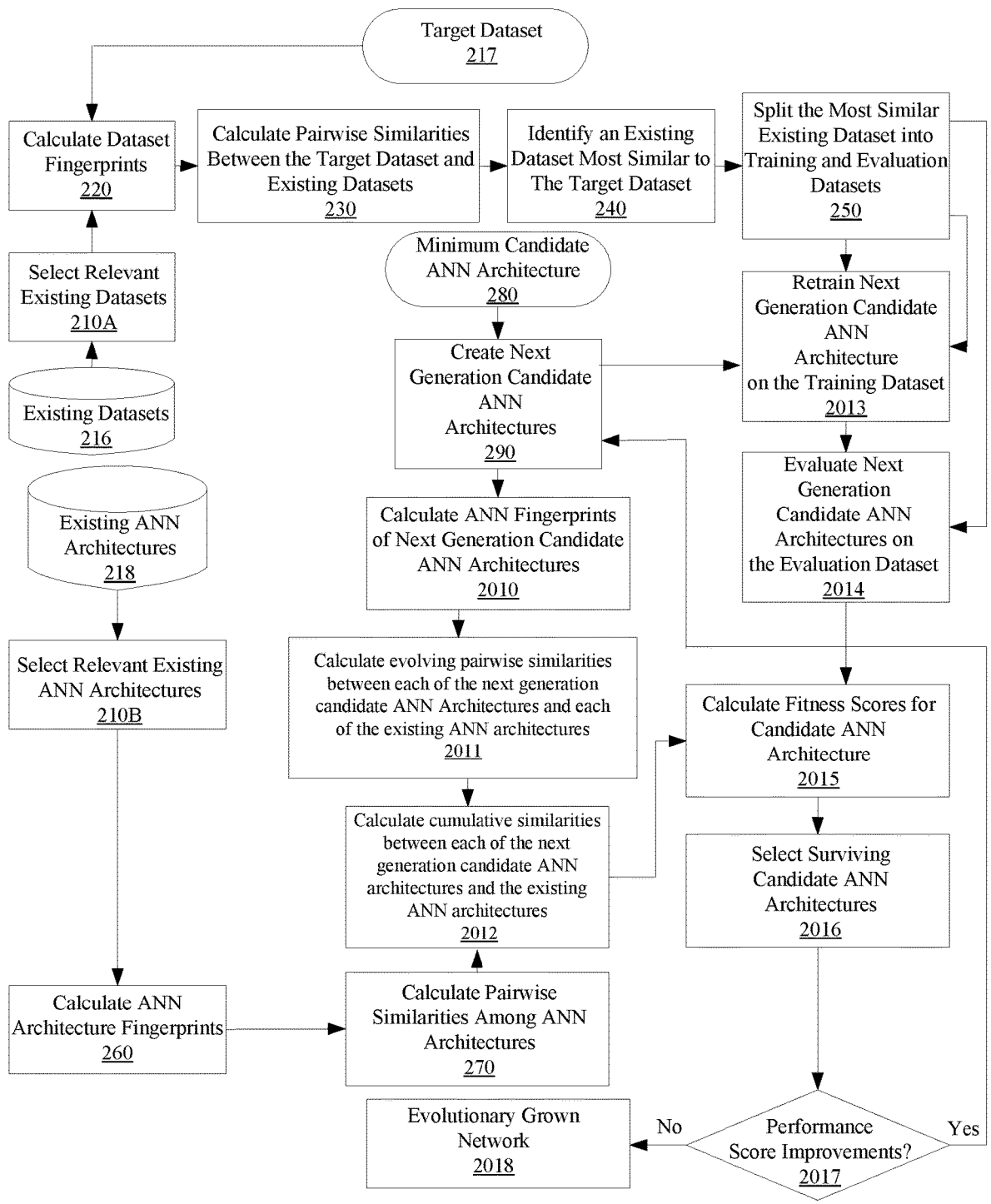
FIG. 2 shows a data flow for discovering novel ANN architectures by a guided evolutionary growth, according to an embodiment.

FIG. 2 shows a data flow for discovering novel ANN architectures by a guided evolutionary growth, according to an embodiment. A first step 210A, 210B includes selecting relevant existing datasets and selecting relevant existing ANN architectures. For an embodiment, this includes selecting a plurality of existing ANN architectures of a same architecture type as ANN architectures that have been used for performing the specified inference task, and selecting a plurality of existing datasets that have been used to train the plurality of the existing ANN architectures.

For an embodiment, different ANN architectures are considered to be of same type if they use as a same type of input datasets and perform inference tasks of a same type. As previously stated, for an embodiment, different inference tasks are considered to be of same type if they are performed on datasets of a same type and produce object labels of a same type.

A second step 220 include calculating existing dataset fingerprints. For an embodiment, this includes calculating an existing dataset fingerprint for each of the plurality of existing datasets and a target dataset fingerprint for the target dataset.

A third step 230 includes calculating pairwise similarities between the target dataset and the existing datasets. For an embodiment, this includes calculating dataset pairwise similarities between each of the plurality of existing datasets and the target dataset using the plurality of the existing dataset fingerprints and the target dataset fingerprint.

A fourth step 240 includes identifying an existing dataset most similar to the target dataset. For an embodiment, this includes identifying an existing dataset of the plurality of existing datasets that is closest to the target dataset using the dataset pairwise similarities between each of the plurality of the existing datasets and the target dataset. For an embodiment, the existing dataset closest to the target dataset is the existing dataset that has the highest similarity to the target dataset.

A fifth step 250 includes splitting the most similar existing dataset into a training dataset and an evaluation dataset. For an embodiment, this includes splitting the existing dataset that is closest to the target dataset into a training dataset and an evaluation dataset.

A sixth step 260 includes calculating existing ANN architecture fingerprints. For an embodiment, this includes calculating a plurality of existing ANN architecture fingerprints-including an existing ANN architecture fingerprint of each of the plurality of existing ANN architectures.

A seventh step 270 includes calculating pairwise similarities among existing ANN architectures. For an embodiment, this includes calculating an existing ANN architecture pairwise similarity between each two of the plurality of the existing ANN architectures.

An eighth step 280 includes creating a minimum possible configuration ANN architecture as a starting point of the guided evolutionary growth process. For an embodiment, the minimum possible configuration of an ANN of some type is the ANN configuration of that type that includes the smallest possible number of layers and is capable of performing same types of inference tasks as ANNs of that type perform.

A ninth step 290 includes creating next generation candidate ANN architectures. For an embodiment this includes creating a plurality of next-generation candidate ANN architectures based on the minimum possible configuration ANN architecture or, if available, current-generation candidate ANN architectures.

A tenth step 2010 includes calculating ANN fingerprints of next generation candidate ANN architectures. For an embodiment, this includes calculating a plurality of next-generation candidate ANN architecture fingerprints including an ANN architecture fingerprint of each of the plurality of next-generation candidate ANN architectures.

An eleventh step 2011 includes calculating evolving pairwise similarities between each of the next generation candidate ANN architectures and each of the existing ANN architectures. For an embodiment, the evolving ANN architecture pairwise similarities are calculated between each of the plurality of existing ANN architectures and each of the plurality of next-generation candidate ANN architectures using the plurality of existing ANN architecture fingerprints and the plurality of next-generation candidate ANN architecture fingerprints.

A twelfth step 2012 includes calculating cumulative similarities between each of the next generation candidate ANN architectures and the plurality of the existing ANN architectures. For an embodiment, this includes calculating cumulative similarities between each of the next-generation candidate ANN architecture and the plurality of the existing ANN architectures using the existing ANN architecture pairwise similarities and the evolving ANN architecture pairwise similarities.

A thirteenth step 2013 includes retraining next generation candidate ANN architectures on the training dataset. For an embodiment, this includes retraining each of the plurality of next-generation candidate ANN architectures with the training dataset. For at least some embodiments, retraining includes training the added/changed layers only, followed up by a few iterations of training the entire network.

A fourteenth step 2014 includes evaluating the performance of next generation candidate ANN architectures on the evaluation dataset. For an embodiment, this includes obtaining performance scores including a performance score of each of the plurality of retrained next-generation candidate ANN architectures using the evaluation dataset and the specified performance criteria.

A fifteenth step 2015 includes calculating fitness scores for candidate ANN architectures. For an embodiment this includes calculating a fitness score for each of the plurality of next-generation candidate ANN architectures using the performance scores and the cumulative similarities.

A sixteenth step 2016 includes selecting surviving candidate ANN architectures. For an embodiment this includes selecting surviving next-generation candidate ANN architectures based on the fitness score for each of the plurality of next-generation candidate ANN architectures.

A seventeenth step 2017 includes checking for performance improvements in the fitness score. For an embodiment this includes determining whether to proceed with another iteration of the evolutionary growth process or to stop the evolutionary growth process and select a candidate ANN architecture with a largest performance score as an outcome.

An eighteenth step 2018 includes completing the evolution of the of the guided evolutionary growth of the ANN architectures.

FIG. 3 shows a system for discovering novel ANN architectures for performing a specified inference task on a target dataset with specified performance criteria by means of a guided evolutionary growth process, according to an embodiment. As shown, the system includes a database 310, one or more computing devices 320 connected through a network 330 to the database 310, and memory 325. For an embodiment, the memory 325 includes instructions that, when executed by the one or more computing devices, enables the system to select a plurality of existing ANN architectures of a same architecture type as any ANN architectures that have been used for performing the specified inference task, and selecting a plurality of existing datasets that have been used to train the plurality of the existing ANN architectures, calculate a plurality of existing dataset fingerprints for each of the plurality of existing datasets and a target dataset fingerprint for the target dataset, calculate dataset pairwise similarities between each of the plurality of existing datasets and the target dataset using the plurality of the existing dataset fingerprints and the target dataset fingerprint, identify an existing dataset of the plurality of datasets that is closest to the target dataset using the pairwise similarities between each of the plurality of the existing datasets and the target dataset, split the existing dataset that is closest to the target dataset into a training dataset and an evaluation dataset, calculate a plurality of existing ANN architecture fingerprints, including an ANN architecture fingerprint of each of the plurality of existing ANN architectures, calculate existing ANN architecture pairwise similarities between each two of the plurality of the existing ANN architectures, create a minimum possible configuration ANN architecture as a starting point of the guided evolutionary growth process, create a plurality of next-generation candidate ANN architectures based on the minimum possible configuration ANN architecture or, if available, current-generation candidate ANN architectures, calculate a plurality of next-generation candidate ANN architecture fingerprints including an ANN architecture fingerprint of each of the plurality of next-generation candidate ANN architectures, calculate evolving ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints, calculate cumulative similarities between each of the next-generation candidate ANN architecture and the plurality of the existing ANN architectures using the existing ANN architecture pairwise similarities and the evolving ANN architecture pairwise similarities, retrain each of the plurality of next-generation candidate ANN architectures with the training dataset, obtain performance scores including a performance score of each of the plurality of retrained next-generation candidate ANN architectures using the evaluation dataset and the specified performance criteria, and calculate a fitness score for each of the plurality of next-generation candidate ANN architectures using the performance scores and the cumulative similarities.

Applications 340 are interfaced with the one or more computing devices through the network 330. The applications include, for example, computer vision, natural language processing, or chatbots, that utilized the system for discovering novel ANN architectures for performing a specified inference task on a target dataset with specified performance criteria by means of a guided evolutionary growth process.

FIG. 4 is a flow chart that includes steps of a method for discovering novel ANN architectures for performing a specified inference task on a target dataset with specified performance criteria by means of a guided evolutionary growth process, according to an embodiment. FIG. 5 is a flow chart that includes a second set of steps of the method for discovering novel ANN architectures for performing a specified inference task on a target dataset with specified performance criteria by means of a guided evolutionary growth process, according to an embodiment.

A first step 410 of the first set of FIG. 4 includes selecting a plurality of existing ANN architectures of a same architecture type as any ANN architectures that have been used for performing the specified inference task, and selecting a plurality of existing datasets that have been used to train the plurality of the existing ANN architectures. For an embodiment, the existing datasets are retrieved from a database or another data storage (for example, one or more archive files accessible over the Internet). For an embodiment, private datasets are accessible over the internet for authorized users or be stored on hardware data storage devices such as an external hard drive that are sent by conventional mail, up to Amazon's 18-wheelers ("Snowmobiles") loaded with hard drive arrays for transporting exabyte-scale amounts of data.

A second step 420 includes calculating a plurality of existing dataset fingerprints for each of the plurality of existing datasets and a target dataset fingerprint for the target dataset. For an embodiment, calculating a plurality of existing dataset fingerprints for each of the plurality of existing datasets and a target dataset fingerprint for the target dataset includes calculating fixed-length real number vectors by mapping the target dataset or any of the plurality of the existing datasets onto the latent space of an existing ANN architecture of a same type as the plurality of the existing ANN architectures pre-trained on a dataset of a same type as the target dataset.

A third step 430 includes calculating dataset pairwise similarities between each of the plurality of existing datasets and the target dataset using the plurality of the existing dataset fingerprints and the target dataset fingerprint. For an embodiment, calculating the dataset pairwise similarities between each of the plurality of the existing datasets and the target dataset comprises calculating, for each of the plurality of the existing datasets, a convolution of the dataset fingerprint of the existing dataset and the dataset fingerprint of the target dataset with a similarity metric.

A fourth step 440 includes identifying an existing dataset of the plurality of datasets that is closest to the target dataset using the pairwise similarities between each of the plurality of the existing datasets and the target dataset. For an embodiment, the dataset closest to the target dataset is the dataset that has the highest pairwise similarity with the target dataset.

A fifth step 450 includes splitting the existing dataset that is closest to the target dataset into a training dataset and an evaluation dataset. For an embodiment, before splitting, the dataset is randomized to ensure that both the training dataset and the evaluation dataset represent same distribution of data point mathematical descriptors and labels. For an embodiment the evaluation set includes as many data points as needed to achieve specified accuracy of the evaluation; all remaining data points are included into the training dataset.

A sixth step 460 includes calculating a plurality of existing ANN architecture fingerprints including an ANN architecture fingerprint of each of the plurality of existing ANN architectures. For an embodiment, calculating the plurality of the existing ANN architecture fingerprints including an existing ANN architecture fingerprint of each of the plurality of the existing ANN architectures comprises obtaining data structures that contain a description of an ANN topology and hyperparameters, wherein the ANN topology includes a map of an ANN layer structure and pairwise connections among the ANN nodes.

A seventh step 470 includes calculating the existing ANN architecture pairwise similarities between every two of the plurality of the existing ANN architectures using the existing ANN architecture fingerprints. For an embodiment, calculating the existing ANN architecture pairwise similarities between every two of the plurality of the existing ANN architectures using the existing ANN architecture fingerprints includes calculating, for every two of the plurality of the existing ANN architectures, convolutions of the existing ANN architecture fingerprints of the two existing ANN architectures with a similarity metric.

An eighth step 480 includes creating a minimum possible configuration ANN architecture as a starting point of the guided evolutionary growth process. For an embodiment, creating the minimum possible configuration ANN architecture includes defining a smallest functional ANN architecture of a same type as the plurality of the existing ANN architectures that is capable of performing same types of inference tasks as ANNs of that type perform. For example, the minimum possible configuration of a fully connected ANN is the configuration with a single hidden layer (also known a single layer perceptron). Likewise, the minimum possible configuration of a convolutional ANN is a convolutional layer followed up by a maxpool layer.

A ninth step 590 (second set of steps of FIG. 5) includes creating a plurality of next-generation candidate ANN architectures based on the minimum possible configuration ANN architecture or, if available, current-generation candidate ANN architectures. For an embodiment, creating the plurality of next-generation candidate ANN architectures includes generating a number of ANN architectures by randomly appending to, deleting from, or altering layers of each of a plurality of current-generation candidate ANN architectures and randomly permutating a type, connectivity, and hyperparameters of added or altered layers in each of the plurality of current-generation candidate ANN architectures.

A tenth step 5010 includes calculating a plurality of next-generation candidate ANN architecture fingerprints including an ANN architecture fingerprint of each of the plurality of next-generation candidate ANN architectures. For an embodiment, calculating the plurality of the next-generation candidate ANN architecture fingerprints including a next-generation candidate ANN architecture fingerprint of each of the plurality of the next-generation candidate ANN architectures comprises obtaining data structures that contain a complete description of an ANN topology and hyperparameters, wherein the ANN topology includes a map of an ANN layer structure and pairwise connections among the ANN nodes.

An eleventh step 5011 includes calculating evolving ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints. For an embodiment, calculating the evolving ANN architecture pairwise similarities between each of the plurality of the existing ANN architectures and each of the plurality of the next-generation candidate ANN architectures using the existing ANN architecture fingerprints and the next-generation candidate ANN architecture fingerprints includes calculating, for every pair of an existing ANN architecture fingerprint and a next-generation candidate ANN architecture fingerprint, convolutions of these two ANN architecture fingerprints with a similarity metric.

A twelfth step 5012 includes calculating cumulative similarities between each of the next-generation candidate ANN architecture and the plurality of the existing ANN architectures using the existing ANN architecture pairwise similarities and the evolving ANN architecture pairwise similarities. For an embodiment, calculating the cumulative similarities between each of the next-generation candidate ANN architectures and the plurality of the existing ANN architectures includes converting each pairwise ANN similarity into a corresponding distance in the ANN architecture space, calculating a Machalanobis or similar cumulative distance between each of the next-generation candidate ANN architecture and the plurality of the existing ANN architectures, and converting the calculated cumulative distances back into cumulative similarities between each of the next-generation candidate ANN architecture and the plurality of the existing ANN architectures.

A thirteenth step 5013 includes retraining each of the plurality of next-generation candidate ANN architectures with the training dataset. For an embodiment, retraining includes training the added/changed layers only (keeping all weights and biases unchanged in the rest of the network that has been trained during previous iterations), followed up by a few iterations of training the entire network (to improve consistency between the added/changed layers and the rest of the network). As such, retraining takes much less time and computing resources than training the entire network from scratch. For an embodiment, retraining each of the plurality of the next-generation candidate ANN architectures includes training each of the plurality of the next-generation candidate ANN architectures on the training dataset with all weights and biases frozen except those in layers added or altered in the obtaining the plurality of the next-generation candidate ANN architectures from the plurality of the current-generation candidate ANN architectures, followed by a few iterations (epochs) of training an entire candidate ANN architecture.

A fourteenth step 5014 includes obtaining a performance score of each of the plurality of retrained next-generation candidate ANN architectures using the evaluation dataset and the specified performance criteria. For an embodiment, obtaining the performance score of a candidate ANN architecture includes evaluating the performance of the candidate ANN architecture on the evaluation dataset with specified performance criteria.

A fifteenth step 5015 includes calculating a fitness score for each of the plurality of next-generation candidate ANN architectures using the performance scores and the cumulative similarities. An embodiment further includes selecting surviving next-generation candidate ANN architectures based on the fitness score for each of the plurality of next-generation candidate ANN architectures. An embodiment further includes determining whether to proceed with another iteration of the evolutionary growth process or to stop the evolutionary growth process and select a candidate ANN architecture with a largest performance score as an outcome.

For at least some embodiments, determining whether to proceed with another iteration of the evolutionary growth process includes determining whether a median fitness score calculated for the plurality of the next-generation candidate ANN architecture is greater than a median fitness score calculated for a plurality of the current-generation candidate ANN architectures. Further, for an embodiment, selecting the surviving next-generation candidate ANN architectures includes selecting the next-generation candidate ANN architectures with fitness scores greater than the median fitness score calculated for the plurality of the current-generation candidate ANN architectures.

For an embodiment, calculating the fitness score of the next-generation candidate ANN architectures comprises calculating a weighted sum of a performance score of a candidate ANN architecture and cumulative similarity of the candidate ANN architecture to the plurality of existing ANN architectures.

For an embodiment, obtaining the performance score of the next-generation candidate ANN architectures comprises evaluating a performance of a candidate ANN architecture on the evaluation dataset with specified performance criteria. For an embodiment, calculating the cumulative similarities between each of the next-generation candidate ANN architectures and the plurality of the existing ANN architectures comprises converting each pairwise ANN similarity into a corresponding distance in the ANN architecture space, calculating a (Machalanobis or similar) cumulative distance between each of the next-generation candidate ANN architecture and the plurality of the existing ANN architectures, and converting the calculated cumulative distances back into cumulative similarities between each of the next-generation candidate ANN architecture and the plurality of the existing ANN architectures.

For an embodiment, calculating the evolving ANN architecture pairwise similarities between each of the plurality of existing ANN architectures and each of the plurality of next-generation candidate ANN architectures using the existing ANN architecture fingerprints and the evolving ANN architecture fingerprints comprises calculating convolutions of the existing ANN architecture fingerprint for each of the plurality of existing ANN architectures and the evolving ANN architecture fingerprint for each of the plurality of next-generation candidate ANN architectures with a similarity metric. That is, for each one existing ANN fingerprint and each one evolving ANN fingerprint, a convolution of these two fingerprints is calculated with a similarity metric.

For an embodiment, calculating the plurality of the evolving ANN architecture fingerprints including an ANN architecture fingerprint for each of the plurality of the next-generation candidate ANN architectures comprises obtaining data structures that contain a complete description of an ANN topology and hyperparameters, wherein the ANN topology comprises a map of an ANN layer structure and pairwise connections among the ANN nodes.

Calculating the Dataset Pairwise Similarities

Steps 230, 430 reference the calculation of dataset pairwise similarities. For at least some embodiments, calculating the dataset pairwise similarity between the target dataset and any of the plurality of the existing datasets includes calculating convolutions of two dataset fingerprints of the target dataset and the existing dataset with a similarity metric. For at least some embodiments, where dataset fingerprints are fixed-length vectors of real numbers, a convolution of two dataset fingerprints with a similarity metric is a matrix product of one dataset, a similarity matrix, and the other dataset that produces a real number, which is divided by a product of the first fingerprint vector norm and the second fingerprint vector norm in order to scale the calculated similarity values to the range from 0.0 to 1.0. For example, the cosine similarity is calculated using the identity matrix as the similarity matrix, with the result being the normalized dot-product of the two fingerprint vectors. For at least some embodiments, the dataset fingerprints are reduced representations of the datasets that have a simpler (for example, one-dimensional) structure and significantly fewer dimensions than the datasets and obey a similarity principle. For an embodiment, the similarity principle stipulates that the dataset fingerprints are also similar for two similar datasets, and the dataset fingerprints are significantly not similar for two significantly different datasets. For an embodiment, the similarity values calculated for fingerprints of two objects (of the same type) fall in the range between 0.0 and 1.0. Similarity values close to 1.0 indicate that the fingerprints (and therefore the objects) are quite similar, whereas similarity values close to 0.0 indicate that the fingerprints (and therefore the objects) are nearly as dissimilar as possible. For an embodiment, the dataset fingerprints are determined to be similar for two similar datasets when the similarity values are greater than a threshold value, and the dataset fingerprints are significantly not similar for two significantly different datasets when the similarity values are less than the threshold value.

Calculating the Dataset Fingerprints

Steps 220, 420 reference the calculation of dataset fingerprints. For at least some embodiments, calculating the dataset fingerprints includes calculating a fixed-length real number vectors by mapping a dataset of the target dataset or anyone of the existing data sets onto a latent space of an existing ANN architecture pre-trained on one or more other datasets of a same type.

Calculating the Cumulative Similarity Between an ANN Architecture Candidate and the Plurality of the Existing ANN Architectures For an embodiment, the cumulative similarity between a candidate ANN architecture and the plurality of the existing ANN architectures is calculated for example, as follows:

calculating ANN architecture fingerprints for the ANN architecture candidates and the reference ANN architectures (the latter can be calculated at the first step and then reused at all subsequent steps);

calculating all pairwise ANN architecture similarities among the ANN architecture candidate and the reference ANN architectures;

converting each calculated pairwise ANN architecture similarity into a pairwise distance between the corresponding ANN architectures in the ANN architecture space, for example, as $d_{ij}=1/(1-S_{ij})$, where $S_{ij}$ is the pairwise similarity and $d_{ij}$ is the associated distance in the ANN architecture space;

calculating a cumulative (Machalanobis or similar) distance between the ANN architecture candidate and the plurality of the reference ANN architectures using the pairwise distances calculated above;

finally, converting the calculated Machalanobis or similar distances back into the cumulative measures of similarity, for example, as $S_k=1-1/d_k^M$, where $d_k^M$ is the Machalanobis or similar distance between ANN architecture candidate k and the plurality of the reference ANN architectures, and $S_k$ is the cumulative similarity between ANN architecture candidate k and the plurality of the reference ANN architectures.

Calculating ANN Architecture Pairwise Similarities

Steps 2011, 270, 5011 reference the calculation of ANN architecture pairwise similarities. For at least some embodiments, calculating ANN architecture pairwise similarities among the plurality of existing ANN architectures using the ANN architecture fingerprints comprises calculating convolutions of any two of the plurality of ANN architecture fingerprints with a similarity metric. For an embodiment, the similarity metric includes a generalized cosine similarity or another similarity.

For example, the pairwise similarity between ANN architectures X and Y can be calculated as $=\Sigma_{key} G_{X_{key}} G_{Y_{key}} / \sqrt{(\Sigma_{key} G_{X_{key}} G_{X_{key}})(\Sigma_{key} G_{Y_{key}} G_{Y_{key}})}$, where $G_X$ and $G_Y$ are the respective ANN architecture fingerprints, the sum index runs over the set of top level keys in $G_X$ and $G_Y$, respectively, and the products of elements $G_{X_{key}}$ and $G_{Y_{key}}$ are defined as follows:

- If the values $G_{X_{key}}$ and $G_{Y_{key}}$ in the two fingerprints for the same key are of different types (e.g., a tensor and a list of key-value pairs) or the value is missing in one of the fingerprints, the product is zero
- If the values $G_{X_{key}}$ and $G_{Y_{key}}$ in the two fingerprints for the same key are alphanumeric strings, the product is 1.0 if the strings are identical and 0.0 otherwise
- If the values $G_{X_{key}}$ and $G_{Y_{key}}$ in the two fingerprints for the same key are real numbers, the product is $\sqrt{G_{X_{key}} G_{Y_{key}}}/(0.5(G_{X_{key}}+G_{Y_{key}}))$
- If the values $G_{X_{key}}$ and $G_{Y_{key}}$ in the two fingerprints for the same key are lists of alphanumeric strings or real numbers, the product is calculated using the cosine similarity
- If the values $G_{X_{key}}$ and $G_{Y_{key}}$ in the two fingerprints for the same key are tensors of the same order, the product is calculated using the cosine similarity and the both tensors reshaped to order 1 (1-dimensional lists). If the order of the two tensors is different, the product is zero.
- If the values $G_{X_{key}}$ and $G_{Y_{key}}$ in the two fingerprints for the same key are nested sets of key-value pairs, the product is calculated by recursively applying the above formula for $Q_{XY}$ to the nested sets.

Calculating a Plurality of ANN Architecture Fingerprints

Steps 260, 2010, 460, 5010 reference calculation of ANN architecture fingerprints. For at least some embodiments, calculating a plurality of ANN architecture fingerprints including an ANN architecture fingerprint of each of the plurality of the existing ANN architectures includes obtaining data structures that contain a complete description of an ANN topology and hyperparameters, wherein the ANN topology includes a map of an ANN layer structure and pairwise connections among nodes of the ANN layer structure.

For an embodiment, the hyperparameters include all ANN parameters other than the states of the nodes and the strengths of pairwise connections among those nodes. For an embodiment, the hyperparameters do not include weights or biases. For an embodiment, the hyperparameters include hierarchical data structures similar to associated arrays, i.e., sets of key-value pairs where keys are alphanumeric strings and values are alphanumeric strings, scalars, lists, tensors, or nested sets of key-value pairs.

Use Cases that Utilize Discovered Novel Neural Network (ANN) Architectures

Figure 7:
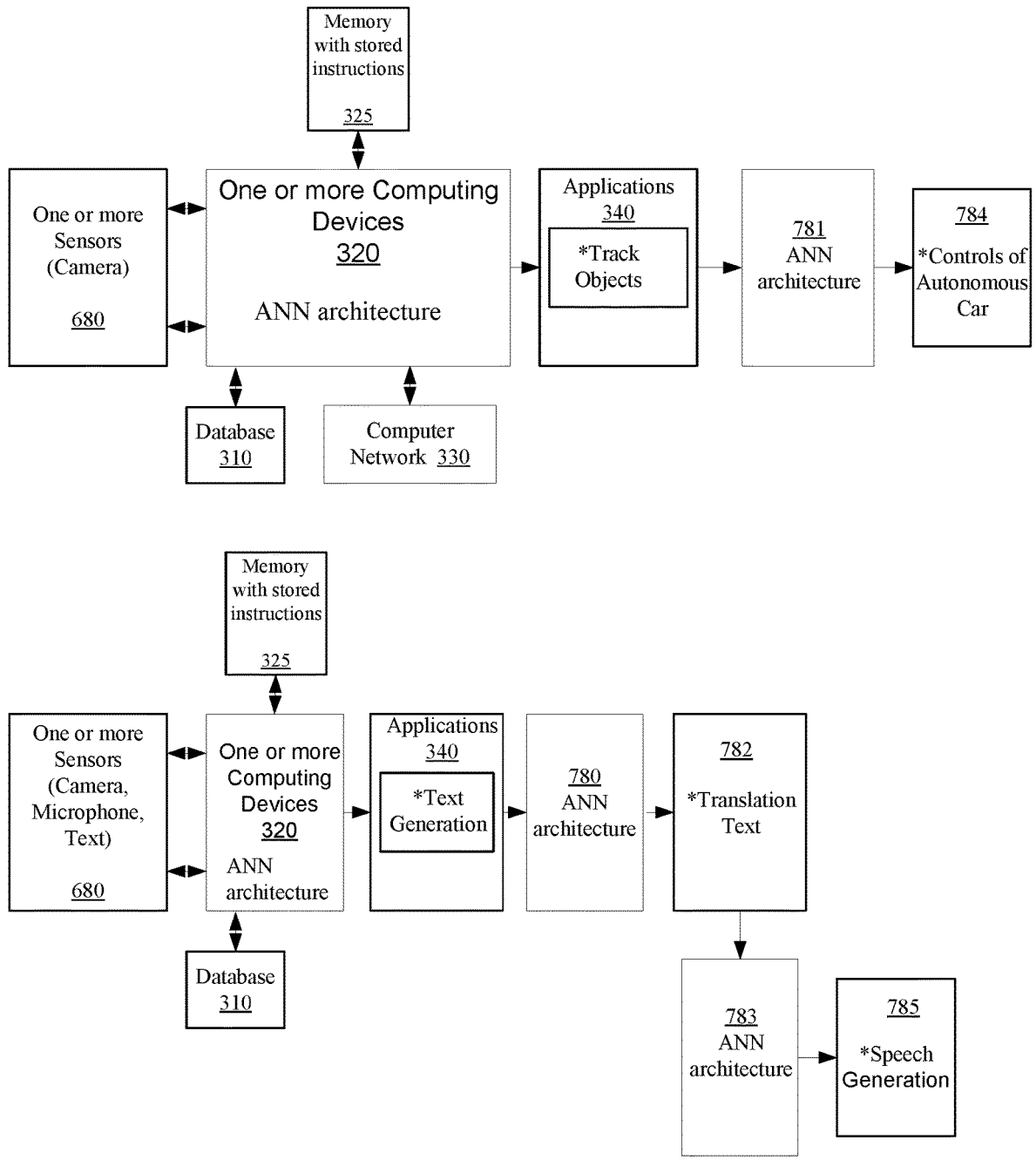

FIG. 6 and FIG. 7 show systems for discovering novel ANN architectures through guided evolutionary growth, wherein one or more sensors 680 operate to generate sensed data that the customer ANN architecture processes, according to an embodiment. For an embodiment, the one or more sensors 680 operate to sense a physical parameter, such as, an image or audible sound. The sensed data can be stored in the database 310 or directly input to the one or more computing devices 320. One or more of the discovered novel ANN architectures can be used to generate an output based on the sensed physical parameters for controlling a physical parameter or for generating useful physical parameter.

Computer Vision

For an embodiment, the one or more sensors 680 include at least one camera (such as, a video camera). For an embodiment, the one or more sensors 680 and the one or more computing devices 320 operate to stream video data to a computer vision ANN of the one or more computing devices 320 (or applications 340) that performs object detection, categorization, and tracking according to one or more of applications 340. For at least some embodiments, an autonomous driving car 784 uses the video stream from a front-facing camera to detect, categorize, and track objects such as pedestrians, bicyclists, other vehicles (cars, trucks, buses, etc.). For an embodiment, the obtained object data is streamed to another ANN 781 that performs reinforcement learning in order to, for example, control the autonomous driving car 784. For at least some embodiment, at least one of the ANNs includes one of the described custom ANN architectures. For an embodiment, one or more of the discovered novel ANN architectures can be connected in such a way that output of one ANN is input of another, providing an end-to-end learning system.

Natural Language Processing

For another embodiment, the one or more sensors 680 include at least one microphone. For an embodiment, the one or more sensors 680 and the one or more computing devices 320 operate to stream audio data to a transformer ANN that converts speech into text. For an embodiment, the text is streamed to other ANN (natural language processor) 780 that perform translation of the text to another language. For an embodiment, the text in the other language is streamed to other ANN (natural language processor) 782 that perform various natural language processing tasks, for example, machine translation of text-to-speech in order to generate speech in another language 785. The speech to text transformer ANN, the translation ANN 780, and the translated text to speech ANN 783 operate to provide real-time machine translation (for example, as an application in a mobile phone). For at least some embodiment, at least one of the ANNs includes one of the described custom ANN architectures. As shown, the end-to-end process includes a 3-step (3-ANN) process of real-time audio translation: 1) speech-to-text (for example, a transformer ANN 320), 2) text translation (for example, a transformer 780), 3) translated text to speech in another language (for example, a recurrent ANN 783). An equivalent 3-step process is described for the Chatbot embodiments. As previously described, for an embodiment, one or more of the discovered novel ANN architectures can be connected in such a way that output of one ANN is input of another, providing an end-to-end learning system.

Chatbots

For at least some embodiments, the described embodiments for natural language processing additionally include comprehending the text, including, for example, machine translation, entity extraction, and sentiment identification. Such an embodiment can be utilized by chatbots that focus on conducting a meaningful dialog with humans (interpreting the text, extracting intent, and identifying and evaluating possible responses). For at least some embodiments, the one or more sensors 680 include one or more microphones that operate to stream audio data to an ANN that performs speech-to-text transformation and sends the text stream to another ANN that generates the response. The response, in turn, is streamed to yet another ANN that converts the response into speech. Each of the ANNs can include the described discovered novel ANN architectures.

Although specific embodiments have been described and illustrated, the described embodiments are not to be limited to the specific forms or arrangements of parts so described and illustrated. The embodiments are limited only by the appended claims.

What is claimed:

1. A method for discovering novel artificial neural network (ANN) architectures for performing a specified inference task on a target dataset of a video data stream with specified performance criteria by means of a guided evolutionary growth process, comprising:

sensing, by a camera of an autonomous driving car, the video data stream;

a) selecting a plurality of existing ANN architectures of a same architecture type as ANN architectures that have been used for performing the specified inference task, and selecting a plurality of existing datasets that have been used to train the plurality of the existing ANN architectures, wherein each of the existing ANN architectures includes an ANN topology and hyperparameters, wherein the ANN topology includes a map of an ANN layer structure and pairwise connections between nodes, and the hyperparameters includes strengths of the pairwise connection and node biases;

b) calculating a plurality of existing dataset fingerprints for each of the plurality of existing datasets and a target dataset fingerprint for the target dataset;

c) calculating dataset pairwise similarities between each of the plurality of existing datasets and the target dataset using the plurality of the existing dataset fingerprints and the target dataset fingerprint;

d) identifying an existing dataset of the plurality of existing datasets that is closest to the target dataset using the dataset pairwise similarities between each of the plurality of the existing datasets and the target dataset;

e) splitting the existing dataset that is closest to the target dataset into a training dataset and an evaluation dataset;

f) calculating a plurality of existing ANN architecture fingerprints, including an ANN architecture fingerprint of each of the plurality of existing ANN architectures, comprising for each of the plurality of existing ANN architectures, obtaining data structures that contain a complete description of the ANN topology and the hyperparameters, wherein the ANN topology includes a map of an ANN layer structure and pairwise connections among nodes of the ANN layer structure;

g) calculating existing ANN architecture pairwise similarities between every two of the plurality of the existing ANN architectures using the existing ANN architecture fingerprints, comprising calculating a summation:

$$\Sigma_{key} G_{X_{key}} G_{Y_{key}} / \sqrt{(\Sigma_{key} G_{X_{key}} G_{X_{key}})(\Sigma_{key} G_{Y_{key}} G_{Y_{key}})},$$

where $G_X$ and $G_Y$ are respective existing ANN architecture fingerprints, and a sum index of the summation runs over a set of top level keys in $G_X$ and $G_Y$;

h) creating a minimum possible configuration ANN architecture as a starting point of the guided evolutionary growth process;

i) creating a plurality of next-generation candidate ANN architectures based on the minimum possible configuration ANN architecture or current-generation candidate ANN architectures when available;

j) calculating a plurality of next-generation candidate ANN architecture fingerprints including an ANN architecture fingerprint of each of the plurality of next-generation candidate ANN architectures;

k) calculating evolving ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints;

l) Calculating cumulative similarities between each of the next-generation candidate ANN architecture and the plurality of the existing ANN architectures using the existing ANN architecture pairwise similarities and the evolving ANN architecture pairwise similarities;

m) retraining each of the plurality of next-generation candidate ANN architectures with the training dataset;

n) obtaining performance scores, including a performance score of each of the plurality of retrained next-generation candidate ANN architectures using the evaluation dataset and the specified performance criteria;

o) calculating a fitness score for each of the plurality of next-generation candidate ANN architectures using the performance scores and the cumulative similarities;

p) selecting surviving next-generation candidate ANN architectures based on the fitness score for each of the plurality of next-generation candidate ANN architectures;

generating, by the selected surviving next-generation candidate ANN architectures operating on one or more computing devices, an output for controlling the autonomous driving car, comprising:

receiving, by the selected surviving next-generation candidate ANN architectures, the sensed video data stream, generating, by the selected surviving next-generation candidate ANN architectures, the output including detecting, categorizing, and tracking objects based on the sensed video data stream, and controlling, by the selected surviving next-generation candidate ANN architectures, the autonomous driving car based on the output.

2. The method of claim 1, further comprising:

p) selecting surviving next-generation candidate ANN architectures based on the fitness score for each of the plurality of next-generation candidate ANN architectures.

3. The method of claim 1, further comprising:

q) determining whether to proceed with another iteration of the evolutionary growth process or to stop the evolutionary growth process and select a candidate ANN architecture with a largest performance score as an outcome.

4. The method of claim 3, wherein determining whether to proceed with another iteration of the evolutionary growth process comprises determining whether a median fitness score calculated for the plurality of the next-generation candidate ANN architecture is greater than a median fitness score calculated for a plurality of the current-generation candidate ANN architectures.

5. The method of claim 4, wherein selecting the surviving next-generation candidate ANN architectures comprises selecting the next-generation candidate ANN architectures with fitness scores greater than the median fitness score calculated for the plurality of the current-generation candidate ANN architectures.

6. The method of claim 1, wherein calculating the fitness score of the next-generation candidate ANN architectures comprises calculating a weighted sum of a performance score of a candidate ANN architecture and cumulative similarity of the candidate ANN architecture to the plurality of existing ANN architectures.

7. The method of claim 6, wherein obtaining the performance score of the next-generation candidate ANN architectures comprises evaluating a performance of a candidate ANN architecture on the evaluation dataset with specified performance criteria.

8. The method of claim 1, wherein retraining each of the plurality of the next-generation candidate ANN architectures comprises training each of the plurality of the next-generation candidate ANN architectures on the training dataset with all weights and biases frozen except those in layers added or altered in the obtaining the plurality of the next-generation candidate ANN architectures from the plurality of the current-generation candidate ANN architectures, followed by a iterations (epochs) of training an entire candidate ANN architecture.

9. The method of claim 6, wherein calculating the cumulative similarities between each of the next-generation candidate ANN architectures and the plurality of the existing ANN architectures comprises converting each pairwise ANN similarity into a corresponding distance in the ANN architecture space, calculating a cumulative distance between each of the next-generation candidate ANN architecture and the plurality of the existing ANN architectures, and converting the calculated cumulative distances back into cumulative similarities between each of the next-generation candidate ANN architecture and the plurality of the existing ANN architectures.

10. The method of claim 9, wherein calculating the existing ANN architecture pairwise similarities between every two of the plurality of the existing ANN architectures using the existing ANN architecture fingerprints comprises calculating, for every two of the plurality of the existing ANN architectures, convolutions of the existing ANN architecture fingerprints of the two existing ANN architectures with a similarity metric.

11. The method of claim 9, wherein calculating the evolving ANN architecture pairwise similarities between each of the plurality of existing ANN architectures and each of the plurality of next-generation candidate ANN architectures using the existing ANN architecture fingerprints and the evolving ANN architecture fingerprints comprises calculating convolutions of the existing ANN architecture fingerprint for each of the plurality of existing ANN architectures and the evolving ANN architecture fingerprint for each of the plurality of next-generation candidate ANN architectures with a similarity metric.

12. The method of claim 10, wherein calculating the plurality of the existing ANN architecture fingerprints including an ANN architecture fingerprint of each of the plurality of the existing ANN architectures comprises obtaining data structures that contain a complete description of an ANN topology and hyperparameters, wherein the ANN topology comprises a map of an ANN layer structure and pairwise connections among the ANN nodes.

13. The method of claim 11, wherein calculating the plurality of the evolving ANN architecture fingerprints including an ANN architecture fingerprint for each of the plurality of the next-generation candidate ANN architectures comprises obtaining data structures that contain a complete description of an ANN topology and hyperparameters, wherein the ANN topology comprises a map of an ANN layer structure and pairwise connections among the ANN nodes.

14. The method of claim 1, wherein creating the plurality of next-generation candidate ANN architectures comprises generating a number of ANN architectures by randomly appending to, deleting from, or altering layers of each of a plurality of current-generation candidate ANN architectures and randomly permutating a type, connectivity, and hyperparameters of added or altered layers in each of the plurality of current-generation candidate ANN architectures.

15. Method of claim 1, further comprising creating a minimum possible configuration ANN architecture comprising defining a smallest functional ANN architecture of a same type as the plurality of the existing ANN architectures.

16. The method of claim 1, wherein calculating the dataset pairwise similarities between each of the plurality of the existing datasets and the target dataset comprises calculating, for each of the plurality of the existing datasets, a convolution of the dataset fingerprint of the existing dataset and the dataset fingerprint of the target dataset with a similarity metric.

17. The method of claim 16, wherein calculating a plurality of existing dataset fingerprints for each of the plurality of existing datasets and a target dataset fingerprint for the target dataset comprises calculating fixed-length real number vectors by mapping the target dataset or any of the plurality of the existing datasets onto a latent space of an existing ANN architecture of a same type as the plurality of the existing ANN architectures pre-trained on a dataset of a same type as the target dataset.

18. A system discovering novel ANN architectures for performing a specified inference task on a target dataset of a video data stream with specified performance criteria by means of a guided evolutionary growth process, comprising:
   a database;
   a camera of an autonomous driving car configured to sense the video data stream;
   one or more computing devices connected through a network to the database,
   memory including instructions that, when executed by the one or more computing devices, enables the system to:
   select a plurality of existing ANN architectures of a same architecture type as any ANN architectures that have been used for performing the specified inference task, and selecting a plurality of existing datasets that have been used to train the plurality of the existing ANN architectures, wherein each of the existing ANN architectures includes an ANN topology and hyperparameters, wherein the ANN topology includes a map of an ANN layer structure and pairwise connections between nodes, and the hyperparameters includes strengths of the pairwise connection and node biases;
   calculate a plurality of existing dataset fingerprints for each of the plurality of existing datasets and a target dataset fingerprint for the target dataset;
   calculate dataset pairwise similarities between each of the plurality of existing datasets and the target dataset using the plurality of the existing dataset fingerprints and the target dataset fingerprint;

identify an existing dataset of the plurality of datasets that is closest to the target dataset using the pairwise similarities between each of the plurality of the existing datasets and the target dataset;

split the existing dataset that is closest to the target dataset into a training dataset and an evaluation dataset;

calculate a plurality of existing ANN architecture fingerprints, including an ANN architecture fingerprint of each of the plurality of existing ANN architectures, comprising for each of the plurality of existing ANN architectures, obtaining data structures that contain a complete description of the ANN topology and the hyperparameters, wherein the ANN topology includes a map of an ANN layer structure and pairwise connections among nodes of the ANN layer structure;

calculate existing ANN architecture pairwise similarities between each two of the plurality of the existing ANN architectures, comprising calculating a summation:

$$\Sigma_{key} G_{X_{key}} G_{Y_{key}} / \sqrt{(\Sigma_{key} G_{X_{key}} G_{X_{key}})(\Sigma_{key} G_{Y_{key}} G_{Y_{key}})},$$

where $G_X$ and $G_Y$ are respective existing ANN architecture fingerprints, and a sum index of the summation runs over a set of top level keys in $G_X$ and $G_Y$;

create a minimum possible configuration ANN architecture as a starting point of the guided evolutionary growth process;

create a plurality of next-generation candidate ANN architectures based on the minimum possible configuration ANN architecture or current-generation candidate ANN architectures when available;

calculate a plurality of next-generation candidate ANN architecture fingerprints including an ANN architecture fingerprint of each of the plurality of next-generation candidate ANN architectures;

calculate evolving ANN architecture pairwise similarities between each of the plurality of existing ANN architectures and each of the plurality of next-generation candidate ANN architectures using the plurality of existing ANN architecture fingerprints and the plurality of next-generation candidate ANN architecture fingerprints;

calculate cumulative similarities between each of the next-generation candidate ANN architecture and the plurality of the existing ANN architectures using the existing ANN architecture pairwise similarities and the evolving ANN architecture pairwise similarities;

retrain each of the plurality of next-generation candidate ANN architectures with the training dataset;

obtain performance scores, including a performance score of each of the plurality of retrained next-generation candidate ANN architectures using the evaluation dataset and the specified performance criteria;

calculate a fitness score for each of the plurality of next-generation candidate ANN architectures using the performance scores and the cumulative similarities;

select surviving next-generation candidate ANN architectures based on the fitness score for each of the plurality of next-generation candidate ANN architectures;

generate by the selected surviving next-generation candidate ANN architectures operating on the one or more computing devices an output for controlling an autonomous driving car, comprising:

the selected surviving next-generation candidate ANN architectures receiving the sensed video data stream, generating by the selected surviving next-generation candidate ANN architectures the output including detecting, categorizing, and tracking objects based on the video data stream, and controlling by the selected surviving next-generation candidate ANN architectures the autonomous driving car based on the output.

19. The method of claim 1, wherein the summation of the calculating the existing ANN architecture pairwise similarities between every two of the plurality of the existing ANN architectures using the existing ANN architecture fingerprints is zero when values $G_{X_{key}}$ and $G_{Y_{key}}$ of a same key are of different types or a value is missing in one of the exiting ANN architecture fingerprints.

20. The method of claim 1, the summation of the calculating the existing ANN architecture pairwise similarities between every two of the plurality of the existing ANN architectures using the existing ANN architecture fingerprints is 1.0 when values $G_{X_{key}}$ and $G_{Y_{key}}$ in the ANN architecture fingerprints for a same key are alphanumeric strings and are identical and 0.0 otherwise.

* * * * *